(12) United States Patent
Kolls et al.

(10) Patent No.: US 10,949,795 B1
(45) Date of Patent: Mar. 16, 2021

(54) SECURE TRANSFER OF ITEMS

(71) Applicant: Wells Fargo Bank, N.A., San Francisco, CA (US)

(72) Inventors: H. Brock Kolls, Alpharetta, GA (US); Thomas Evans, Des Moines, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 898 days.

(21) Appl. No.: 15/665,881

(22) Filed: Aug. 1, 2017

(51) Int. Cl.
| *G06Q 10/08* | (2012.01) |
| *G05D 1/02* | (2020.01) |
| *G07C 9/00* | (2020.01) |
| *B60R 25/01* | (2013.01) |
| *G05D 1/00* | (2006.01) |
| *G06Q 40/08* | (2012.01) |

(52) U.S. Cl.
CPC ......... *G06Q 10/0836* (2013.01); *B60R 25/01* (2013.01); *G05D 1/0212* (2013.01); *G05D 1/0276* (2013.01); *G06Q 10/0833* (2013.01); *G07C 9/00896* (2013.01); *G05D 1/0088* (2013.01); *G05D 2201/0213* (2013.01); *G06Q 40/08* (2013.01); *G07C 9/00571* (2013.01); *G07C 2009/0092* (2013.01)

(58) Field of Classification Search
CPC ............ G06Q 10/0836; G05D 1/0212; G05D 1/0276; G05D 1/0088; G05D 2201/0213; G07C 9/00896; G07C 2009/0092; B60R 25/01
See application file for complete search history.

(56) References Cited

U.S. PATENT DOCUMENTS

| 5,724,243 A | 3/1998 | Westerlage et al. |
| 6,892,131 B2 | 5/2005 | Coffee et al. |
| 7,028,339 B2 | 4/2006 | Stevens |
| 9,230,230 B2 | 1/2016 | Gupta et al. |
| 9,256,852 B1 * | 2/2016 | Myllymaki ............. B60P 3/007 |
| 9,264,297 B2 | 2/2016 | Belmonte |

(Continued)

FOREIGN PATENT DOCUMENTS

WO    WO-2011096813 A1 *  8/2011  ............. G06Q 50/28

OTHER PUBLICATIONS

"Sharing Ledgers for Sharing Economies: An Exploration of Mutual Distributed Ledgers (Aka Blockchain Technology)" by Michael Mainelli, Nov. 7, 2015, Journal of Financial Perspectives (Year: 2015).*

(Continued)

*Primary Examiner* — Kevin H Flynn
*Assistant Examiner* — Ismail A Manejwala
(74) *Attorney, Agent, or Firm* — Merchant & Gould P.C.

(57) ABSTRACT

A method for securely transporting items in an autonomous vehicle (AV) between travel destinations includes implementing an electronic ledger on an electronic computing device. One or more electronic codes for are stored in the electronic ledger for controlling access to a physical container that can be secured in the AV. One or more destination addresses for the AV are stored in the electronic ledger. After receiving an access code that matches one of the one or more electronic codes, the physical container is secured in the AV. A destination address is obtained from the electronic ledger. The AV is directed to transport the physical container to the destination address.

18 Claims, 7 Drawing Sheets

(56) References Cited

U.S. PATENT DOCUMENTS

| | | | |
|---|---|---|---|
| 9,510,316 | B2 | 8/2016 | Skaaksrud |
| 9,523,986 | B1 | 12/2016 | Abebe et al. |
| 9,552,564 | B1 | 1/2017 | Martenis |
| 9,686,481 | B1 * | 6/2017 | Graybill .................. H04N 5/32 |
| 2004/0260470 | A1 | 12/2004 | Rast |
| 2005/0034420 | A1 | 2/2005 | Radlinger et al. |
| 2005/0131645 | A1 | 6/2005 | Panopoulos |
| 2014/0022051 | A1 | 1/2014 | Levien et al. |
| 2015/0100513 | A1 | 4/2015 | Parris |
| 2015/0294262 | A1 | 10/2015 | Nelson et al. |
| 2016/0068264 | A1 * | 3/2016 | Ganesh ............... G08G 5/0069 701/2 |
| 2016/0111006 | A1 * | 4/2016 | Srivastava ........... G08G 5/0026 701/3 |
| 2016/0224931 | A1 | 8/2016 | Shah et al. |
| 2016/0246304 | A1 * | 8/2016 | Canoy .................. G05D 1/0858 |
| 2016/0371643 | A1 | 12/2016 | Parruck et al. |
| 2017/0011340 | A1 | 1/2017 | Gabbai |
| 2017/0147975 | A1 * | 5/2017 | Natarajan ................. B64F 1/00 |
| 2017/0293886 | A1 * | 10/2017 | Bostick ............ G06Q 10/08355 |
| 2017/0372392 | A1 * | 12/2017 | Metnick ............. G06Q 30/0613 |
| 2018/0053150 | A1 * | 2/2018 | Ahsan ..................... H04L 63/08 |

OTHER PUBLICATIONS

Merchán et al., "The Near Future of Megacity Logistics," Megacity Logistics Lab, MIT Center for Transportation & Logistics, Sep. 2015, 25 pages.

Klumpp et al., "Cargo telematics for operational transport excellence and strategic knowledge management," https://www.pim.wiwi.uni-due.de/uploads/tx_itochairt3/talks/Klumpp_Kandel_Wirsing_-_Cargo_telematics_for_operational_transport.PDF, 2013, 15 pages.

* cited by examiner

SECURE TRANSFER OF ITEMS

BACKGROUND

Items of value often need to be transferred from one physical location to one or more additional physical locations. When items of value are transferred, a reliability of a transport vehicle, a reliability of personnel used to operate the transport vehicle and costs associated with the transfer may need to be considered. In addition, there is a possibility of theft of the items of value and and/or theft of the transport vehicle during the transfer.

Costs involved in transferring items from one physical location to another can include a transportation cost, an insurance cost and a security cost. The transportation cost can include a cost of owning or renting the transport vehicle, maintenance of the transport vehicle and fuel costs for the transport vehicle. The insurance cost can include a cost of insuring the item for damages and theft during transport. The security cost can include a cost of security personnel that may be needed to travel or otherwise accompany the transport vehicle. Other costs are possible.

SUMMARY

Embodiments of the disclosure are directed to a method implemented on an electronic computing device for securely transporting items in an autonomous vehicle (AV) between travel destinations, comprising: implementing an electronic ledger on the electronic computing device; storing in the electronic ledger one or more electronic codes for controlling access to a physical container that can be secured in the AV; storing in the electronic ledger one or more destination addresses for the AV; after receiving an access code that matches one of the one or more electronic codes, securing the physical container in the AV; obtaining a destination address from the electronic ledger; and directing the AV to transport the physical container to the destination address.

In another aspect, a method implemented on an electronic computing device for securely transporting items in an autonomous vehicle (AV) between travel destinations comprises: receiving an itinerary for a trip using the AV, the itinerary including one or more destination locations; directing the AV to transport one or more of the items to a first of the destination locations; receiving an access code to access a physical container secured in the AV; determining whether the access code matches a first electronic code for accessing the physical container; identifying a current geolocation for the AV; determining whether the current geolocation matches a geolocation of the first of the destination locations; and when a determination is made that the access code matches the first electronic code and that the current geolocation matches the geolocation of the first of the destination locations, releasing the physical container from the AV.

In yet another aspect, an electronic computing device comprises: a processing unit; and system memory, the system memory including instructions which, when executed by the processing unit, cause the electronic computing device to: receive one or more electronic codes for controlling access to a physical container that can be secured in an autonomous vehicle (AV), the one or more electronic codes including an access code, a lock code and an unlock code; receive one or more destination locations for the AV; receive an indication that the physical container is secured in the AV; after the physical container is secured in the AV, initiate a command to direct the AV transport the physical container to a first of the one or more destination locations; receive a first electronic code to access the physical container; receive a current geolocation of the AV; determine whether the current geolocation of the AV matches a first of the one or more destination locations; when a determination is made that the current geolocation of the AV matches one of the one or more destination locations: determine whether the first electronic code matches the access code; when a determination is made that the first electronic code matches the access code: release the physical container from a secured position in the AV; receive a second electronic code to unlock the physical container; and when a determination is made that the second electronic code matches the unlock code, unlock the physical container and permit the physical container to be opened; and when a determination is made that the current geolocation of the AV does not match any of the one or more destination locations, prevent the physical container from being released from the secured position in the AV.

The details of one or more techniques are set forth in the accompanying drawings and the description below. Other features, objects, and advantages of these techniques will be apparent from the description, drawings, and claims.

DETAILED DESCRIPTION

Figure 1:
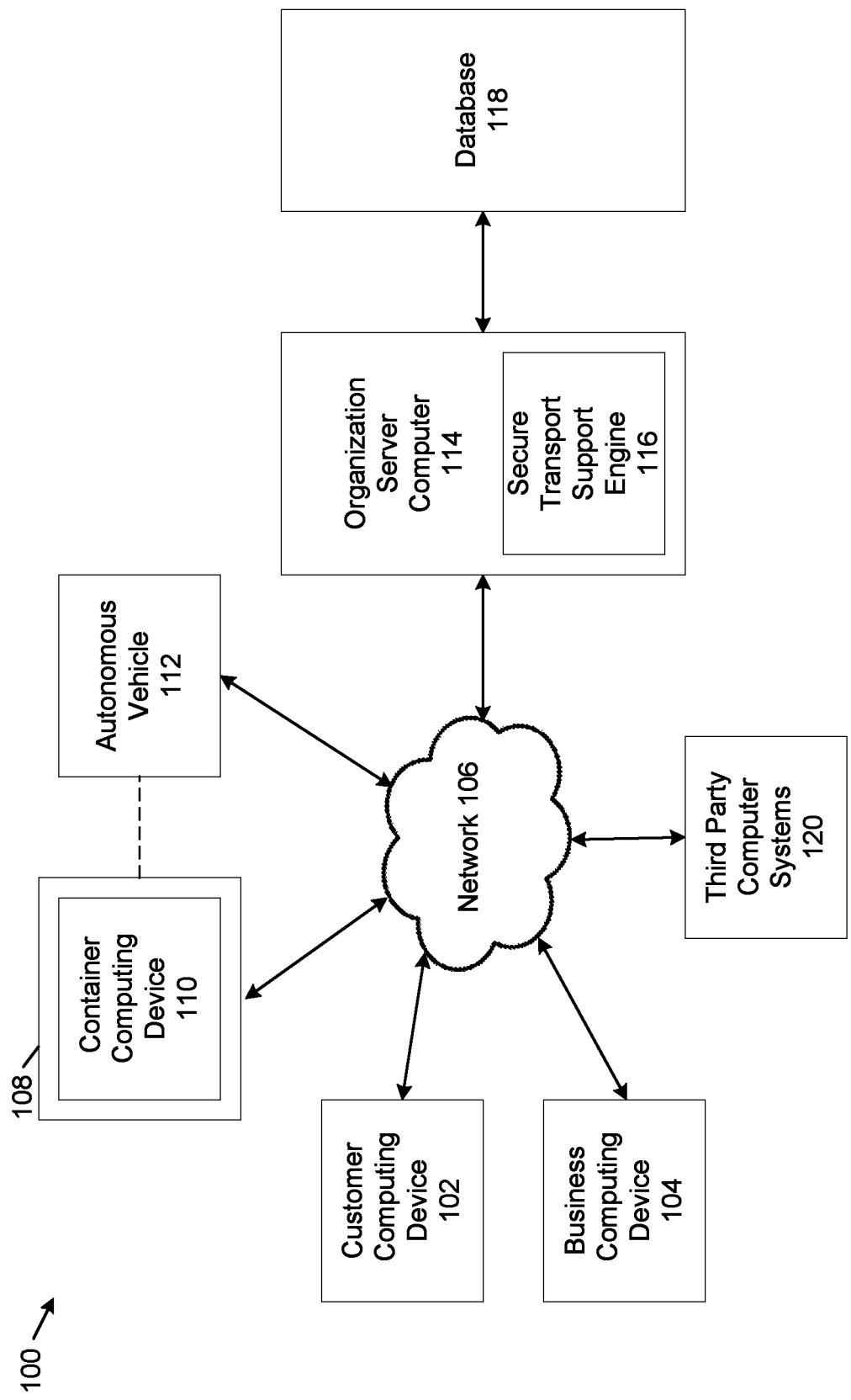
FIG. 1 shows an example system that supports secure transfer of items using an autonomous vehicle.

The present disclosure is directed to systems and methods for secure transfer of an item (or multiple items) using an autonomous vehicle (AV).

Using the example systems and methods described herein, an individual wishing to transport the item from one physical location to another can access the AV and put the item in a physical container that can be placed on or mounted in the AV. The individual can use a personal electronic device, such as a smart phone, to generate electronic codes that can lock the physical container and store the physical container in the AV. Additional electronic codes can be generated that can access and unlock the physical container at a destination location.

The access and unlock codes can then be sent to an individual at the destination location. The systems and methods can provide for geo-fencing, such that the physical container can only be accessed and unlocked at the destination location and only by using the access and unlock codes sent to the individual. The geo-fencing establishes a global positioning system (GPS) location (e.g. the destination location) such that the physical container can only be accessed and unlocked at the geo-fenced location.

Items to be transferred can be any item that can physically fit in the physical container. Example items that can be transferred include documents, jewelry, money, antiques and anything else that can physically fit in the physical container. In some implementations, the physical container can be securely attached or mounted to an interior of the AV. For these implementations, the access code can be used to release the physical container from the AV. For other implementations, the physical container can be placed within a larger container that is physically mounted to an interior to the AV. For these other implementations, the access code can be used to unlock the larger container so that the smaller physical container can be removed from the larger container.

The systems and methods can also be used to deliver items to multiple physical locations and a plurality of individuals can be involved. In an example implementation discussed in more detail later herein, an employee of a jewelry store can place a purchased item of jewelry in a physical container, put the physical container in an AV and direct the AV to a physical location of an appraiser. The appraiser can then access and unlock the physical container, appraise the jewelry, put the jewelry back in the physical container along with the appraisal, mount or place the physical container back in the AV and direct the AV back to the jewelry store. In addition, the appraiser can place one or more additional items of jewelry and appraisals, perhaps for a different customer, into the physical container before directing the AV back to the jewelry store or to another location.

The systems and methods can also make use of a distributed ledger to store and update information regarding the transport of items in the AV. As used in this disclosure, a distributed ledger is a database that is consensually shared and synchronized across a network spread across multiple sites or geographies. Transactions related to physically transporting an item can be maintained in a local, decentralized copy of the distributed ledger and saved to the database. Any changes or additions made to any copy of the distributed ledger can be copied to all participants using the distributed ledger, including the database in a short period of time, for example in minutes or seconds. Furthermore, data can be stored in the distributed ledger using cryptography.

A copy of the distributed ledger can be stored in an electronic computing device that can be placed in, stored in, or embedded in the physical container. The distributed ledger can include data such as the physical locations to which the AV is to transport the item, identification information regarding the item, and other information regarding the item, such as an electronic appraisal for the item. Individuals at each of the physical locations at which the AV is directed can access and enter data into the distributed ledger. In addition, any information entered into the distributed ledger can be sent to a server computer for storage and to provide a duplicate copy of the distributed ledger.

The distributed ledger can also be programmed with a return address for use when transport does not go as planned. The return address can be used to direct the AV to a secure location. For example, an elapsed time an AV traveling to a destination can be calculated, and when a physical location is not reached within a specified period of time, the AV can be rerouted to the return address. As another example, when a payment needs to be made prior to a delivery and the payment is not made, the AV can be automatically rerouted to the return address.

The distributed ledger can be implemented using block chain technology. With block chain technology, any data entered into the distributed ledger can be immutable so that the data cannot be changed once it is entered. The block chain technology can provide security for the physical transport because any attempt to change information in the distributed ledger, for example via malware or theft, can be detected and flagged.

The server computer that stores the distributed ledger can be a server computer at an organization can implement the secure and confidential physical transport of the items. In one example implementation, the organization can be a security company that can provide AVs for transport. In another example implementation, the organization can be a financial organization at which the individual who owns the item has one or more financial accounts. In still another implementation, the organization can be a retail store. When the organization, is the financial institution or the retail store, the systems and methods can also include one or server computers from third party organizations, for example from the security company, that can help implement the physical transport. Other organizations are possible.

In a preferred example implementation, the AV can be a self-driving car that can be owned by the security company or obtained from an organization that provides secure AVs. In other implementations, the AV can be a drone, an airplane or another autonomous transportation vehicle.

In addition to a security of transport provided by use of a secure AV in conjunction with access, lock and unlock electronic codes, a transport request can exclude all shipping related data, including an identity of a recipient of the transport request, and only include a geolocation of a physical destination. The geolocation can be obtained via global positioning system (GPS) software that can be included in the electronic computing device in the physical container. Because the access, lock and unlock electronic codes are sent separately to individuals independently of the physical container, any theft of the physical container will not reveal confidential information regarding the individuals.

In an example implementation, the organization that implements the physical transport can charge the customer a transport fee for transporting the item. The systems and methods also support the payment of an insurance fee to generate additional revenue. For example, the customer can pay the organization an insurance fee for safe transport of the item to a physical destination. The customer can also pay an additional fee to the organization for driving non-stop to the physical destination and not stopping at additional locations first to pickup items of transport from another customer.

The systems and methods disclosed herein are directed to a computer technology that can automatically and securely transport items from one physical location to another using an AV. The AV can include a physical container that can be securely locked and mounted in the AV. The physical container can include a distributed ledger than can store details regarding the transport of the items. Security can be enhanced via electronic codes that can be generated to-access, lock and unlock the physical container. Geo-fencing can provide an additional layer of security by only permitting the physical container to be accessed and unlocked at configured geolocations and only when the correct access and unlock codes are used.

FIG. 1 shows an example system 100 that can support secure and confidential transportation of items using an AV. System 100 includes a customer computing device 102, a business computing device 104, a network 106, a physical container 108, a container computing device 110 that is embedded in or otherwise included in the physical container 108, an autonomous vehicle 112, an organization server computer 114, a database 118 and third party computer systems 120. Organization server computer 114 includes a secure transport engine 116. Physical container 108 is mounted in or placed in autonomous vehicle 112. More, fewer, or different components can be used.

The example customer computing device 102 is an electronic computing device of a customer. The customer is typically a customer of a retail store at which the item was purchased or a customer of a transportation organization that can securely transport the item to a destination. The electronic computing device is typically a mobile device such as a smart phone, but can also be a desktop computer, a laptop computer or a tablet computer or a smartphone.

The customer computing device 102 can generate electronic codes that can be provided by the customer to access, lock and unlock physical container 108. Customer computing device 102 can send the electronic codes to an individual at the destination location, for example to an individual at business computing device 104. Customer computing device 102 can also interface with an electronic ledger stored in container computing device 110 and enter transport information and other information into the electronic ledger. The transport information can include one or more destination locations to which the item is to be transported. The other information can include information relating to the item, such as a description or identifier for the item. Information stored in the electronic ledger can also be sent across network 106 to organization server computer 114. The information can be stored at organization server computer 114, at database 118 or at another server computer or database accessible from organization server computer 114. The stored information can comprise a backup to the electronic ledger.

The example business computing device 104 is an electronic computing device of an employee of a business at the destination location. The electronic computing device can be one or more of a desktop computer, or a mobile device such as a smartphone, a laptop computer or a desktop computer.

Business computing device 104 can receive the electronic codes sent to it by customer computing device 102. Business computing device 104 can then use the electronic codes to access, lock and unlock the physical container when the AV arrives at a geolocation of business computing device 104. Business computing device 104 can also update the electronic ledger included with container computing device 110. In addition, business computing device 104, can send the electronic codes and any updates to the electronic ledger to organization server computer 114.

The example network 106 is a computer network such as the Internet. Customer computing device 102 and business computing device 104 can wirelessly connect to or otherwise access organization server computer 114 via network 106.

The example physical container 108 is a container having a shape and size configured to hold one or more items. In this example, the physical container 108 has a rectangular shape that can be mounted to or placed in the AV. An item to be transferred can be placed into physical container 108 for transport. When physical container 108 is mounted in the AV, the access code can be used to release physical container 108 from a mounting location so that physical container 108 can be accessed. Physical container 108 can then be unlocked using the unlock code. When physical container 108 is placed in the AV, for example in an area of the AV that can be secure the AV during transport, such as a larger container that is secured to the AV, in some implementations, physical container 108 may be able to be removed from the area without need of an access code. In other implementations, the access code may be needed to unlock the larger container so that physical container 108 can be removed. The unlock code can then be used to unlock physical container 108.

Physical container 108 typically has an identifier, such as a unique number. The identifier can be an identifying tag that can be mounted to physical container 108 and/or the identifier can be electronically accessed. In some implementations, physical container 108 can include a radio frequency identification device (RFID) by which the identifier can be electronically accessed.

The example container computing device 110 is an electronic computing device that can be mounted in or embedded in physical container 108. Container computing device 110 can include functionality for accessing, locking and unlocking physical container 108. Container computing device 110 can also include functionality for an electronic distributed ledger, as discussed earlier herein and will be discussed in more detail later herein.

The example autonomous vehicle 112 is a self-driving car that can be used to physically transport an item from one geolocation to another geolocation. Autonomous vehicle 112 includes either a mounting mechanism or a placement area for the physical container in which the item can be placed for transport. The mounting mechanism can be one that accepts the physical container and then retracts the physical container into a structure like a cabinet or rack.

The physical container can be extracted from the structure upon reception and processing of an access code. The placement area can be a container larger than the physical container that can accept and secure the physical container during transport. For example, the placement area can comprise a square or rectangular container that can be attached to an interior of autonomous vehicle 112. When the physical container is placed in the placement area, the physical container can be secured, for example via a cover over the larger container, via magnetic means or other means.

The physical container can be removed from the larger container upon reception and processing of the access code. In an example implementation, the access code can be used to both permit accessing physical container 108 and also to remount the physical container or to re-secure physical container 108.

Autonomous vehicle 112 also includes an electronic computing device that can receive a command to navigate autonomous vehicle 112. In some implementations, the command can be received from organization server computer 114 to direct the AV to a specific geolocation. In other implementations, the command can also be received from container computing device 110 based on a geolocation obtained from the electronic ledger stored on container computing device 110.

The example organization server computer 114 is a server computer at an organization that can provide AVs configured to securely transport items. In an example implementation, the organization can be a transportation security company that can provide AVs. In another implementation, the organization can be a financial institution in which the customer has one or more financial accounts. The financial institution can have an agreement with a third party organization such as a transportation security company to provide AVs for transporting items.

The example secure transport engine 116 includes functionality for receiving and processing a distributed electronic ledger from one or more container computing devices, thereby providing redundancy and additional security regarding the distributed electronic ledger. Secure transport engine 116 also includes functionality for receiving and processing commands to direct an AV from one physical location to another. Additional functionality is possible. The secure transport engine 116 is described in greater detail later herein.

The example database 118 is a database associated with the organization. Distributed ledgers can be stored in database 118. In addition, if the organization is a financial institution, financial and personal information for the customer can also be stored in database 118. Database 118 can be distributed over a plurality of databases. The secure transport engine 116 can be programmed to query (e.g. using SQL) database 118 to obtain customer profile and geolocation information for the AV. Various profile information, and distributed ledger information can be stored in and retrieved from database 118.

The example third party computer systems 120 are server computers of third party organizations that can work in conjunction with organization server computer 114. For example, when organization server computer 114 is a server computer of a transportation security company, a third party computer system 120 can be server computer of a financial institution. Conversely, when organization server computer 114 is a server computer of the financial institution, a third party computer system 120 can be the server computer of the transportation security company. Other third party computer systems 120 are possible.

There can be various technical advantages associated with the systems and methods described herein. For example, organization server computer 114 can send container computing device 110 an itinerary for transporting an item to one or more destinations. Once container computing device 110 has the itinerary, container computing device 110 can implement the transportation of the item with minimum communication with organization server computer 114. For example, container computing device 110 can process access codes, unlock codes and lock codes without any communication with organization server computer 114. Container computing device 110 can also communicate with other electronics on the AV to direct the AV from one destination location to another. This can result in fewer computing cycles and enhanced efficiencies for organization server computer 114.

Figure 2:
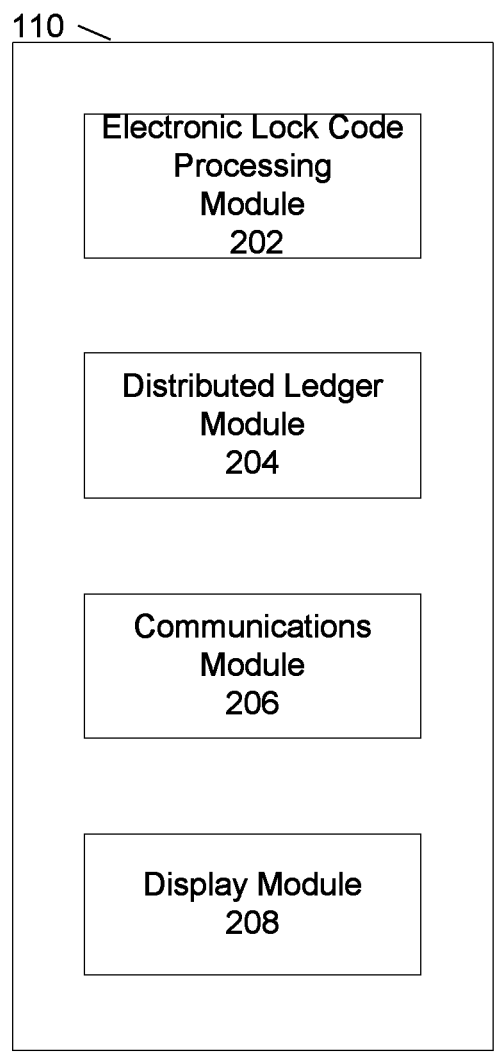
FIG. 2 show example modules of the container computing device of the system of FIG. 1.

FIG. 2 shows example modules of container computing device 110. The example modules include an electronic lock code processing module 202, a distributed ledger module 204, a communications module 206 and a display module 208. More, fewer and different modules are possible.

The example electronic lock code processing module 202 receives and processes access codes, lock codes and unlock codes that can be used to access and unlock physical container 108 in the AV. The access codes, lock codes and unlock codes can be generated via a software application on customer computing device 102 or business computing device 104. In an example implementation, when an AV arrives with an empty physical container 108 at a geolocation of a customer, the customer can generate an access code on customer computing device 102 to release physical container 108 from a secured location in the AV. The customer can insert an item for transfer into physical container 108 and use customer computing device 102 to generate a lock code for physical container 108. The customer can then use the access code to remount physical container 108 in the AV or to place physical container 108 into a secure area (for example, the larger container) in the AV.

In one example implementation, the customer can send the access code, lock code and unlock code to an individual at the next physical location. For example, the customer can send an email to the individual with the access code, lock code and unlock code. For this implementation, distributed ledger does not store the email address of the individual or any other contact information for the individual. This provides another layer of security for a situation where the AV or the physical container are stolen or lost.

Electronic lock code processing module 202 can receive the lock code, unlock code and access code and store these codes and/or send the codes to database 118 for storage. When the AV arrives at the next physical location, the electronic lock code processing module can receive an access code and unlock code from an individual, for example an employee at business computing device 104, the next physical location. When the received access code matches a previously saved access code, electronic lock code processing module 202 can initiate a command to release physical container 108 from mounted or placed location. In addition, when the received unlock code matches a previously saved unlock code, electronic lock code processing module 202 can initiate a command to unlock physical container 108 and permit the employee to access the item therein.

The example distributed ledger module 204 stores information related to the physical transport of the item in the AV. The information stored can include a description of the physical locations to which the AV is to travel. The description can include a geolocation of each physical location, a textual description of the physical location, a contact person at the physical location and a sequence order of the physical locations. The distributed ledger module 204 can also store access codes, lock codes and unlock codes used to access, lock and unlock physical container 108 at each of the physical locations.

Authorized individuals at each of the physical locations can access distributed ledger module 204 to read selected contents from distributed ledger module 204 and to enter new information into distributed ledger module 204. In an example implementation, the access code can be used as an authorization password to access the distributed ledger module 204. The customer at the customer physical location can set the access code and then email the access code to an individual at a destination physical location. The individual at the destination physical location can use the access code, but only at a geolocation of the destination physical location, to access the distributed ledger module 204. Once the individual at the destination location accesses the distributed ledger, the individual can enter a new access code. The new access code can be sent to an individual at the next destination physical location. In addition, because the distributed ledger is stored in container computing device 110 and container computing device 110 travels with the physical container 108 and the autonomous vehicle 112, the distributed ledger is available for access at each destination physical location.

As discussed earlier herein, information entered into the distributed ledger is also sent to organization server computer 114 for security and to store a backup of the distributed ledger. In addition, information entered into the distributed ledger is encrypted so that the information is immutable. Any party who has access to the distributed ledger can compare copies, and if one copy doesn't compare, that copy can be identified to have corrupted data.

The example communications module 206 permits communication between container computing device 110 and one or more of customer computing device 102 and business computing device 104, autonomous vehicle 112 and organization server computer 114. For example, communication between container computing device 110 and customer computing device 102 can comprise customer computing device 102 sending container computing device 110 one or more of an access code, a lock code and an unlock code for physical container 108. Communication between container computing device 110 and autonomous vehicle 112 can comprise sending autonomous vehicle 112 a GPS location of a destination address and sending autonomous vehicle 112 a command to initiate travel to the destination address. Communication between container computing device 110 and organization server computer 114 can comprise receiving an itinerary of destination addresses from organization server computer 114 and sending a copy of the distributed ledger to organization server computer 114. Additional or other communication is possible.

The example display module 208 permits interfacing with a display device to display one more destination locations stored on or accessible from container computing device 110. The display device can be mounted to physical container 108 and electrically connected to container computing device 110. In an example implementation, the display device can display a status of a transport itinerary, including a next destination location, to an individual who can access physical container 108.

Figure 3:
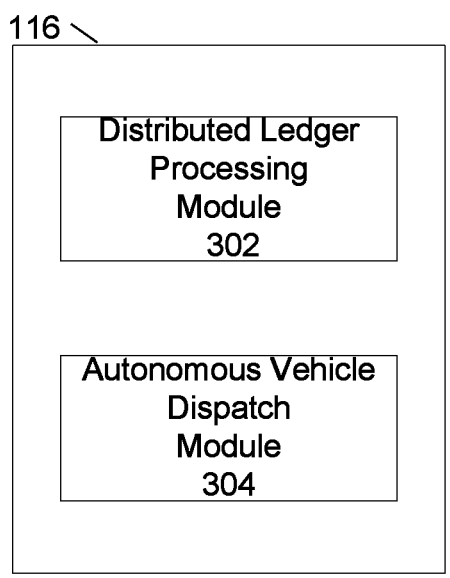
FIG. 3 shows example modules of the secure transport engine of the system of FIG. 1.

FIG. 3 shows example modules of the secure transport engine 116. The example modules include a distributed ledger processing module 302 and an autonomous vehicle dispatch module 304. More, fewer or different modules are possible.

The example distributed ledger processing module 302 can obtain a copy of a distributed ledger from organization server computer 114, receive and store updates to the distributed ledger from customer computing device 102 and business computing device 104 and synchronize any updates to the distributed ledger with organization server computer 114. Organization server computer 114, in turn, can save any updates to the distributed ledger on database 118. The updates to the distributed ledger can comprise updates for items such as access codes, lock codes, unlock codes and destination addresses. In addition, the distributed ledger processing module can use cryptographic keys to encrypt any data stored in the distributed ledger.

The example autonomous vehicle dispatch module 304 can receive a request for an autonomous vehicle and direct the autonomous vehicle to a destination location. An initial request can be received from an individual at customer computing device 102. When the organization is an organization that provides AVs for transport, for example a transport security company, the autonomous vehicle dispatch module 304 can access the AV. However, when the organization is one that does not have access to AVs for transport, such as a financial institution, the autonomous vehicle dispatch module 304 can initiate a request to the transport security company for the AV.

Once the AV has been delivered to a geolocation of a customer, additional requests to direct the AV to a destination location can be received at organization server computer 114 from customer computing device 102 or from business computing device 104. Alternatively, in some implementations the additional requests to direct the AV to the destination location can be handled by container computing device 110.

Figure 4:
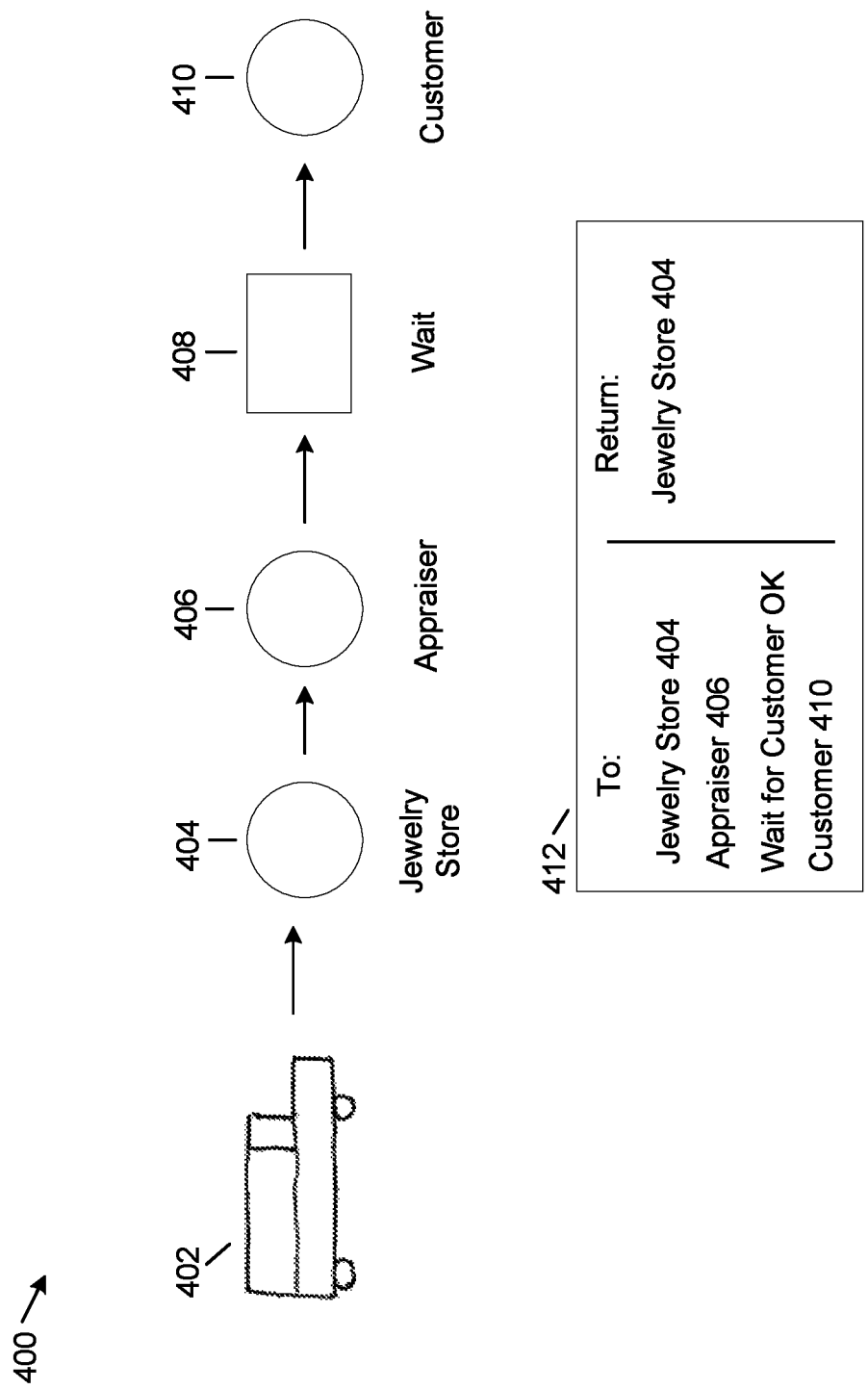
FIG. 4 shows an example process diagram that illustrates a secure transfer of items using an autonomous vehicle.

FIG. 4 shows a process diagram of an example use case 400 that can be implemented using the systems and methods. The example use case comprises a purchase of an item of jewelry, an appraisal of the item, and a return of the item to the customer.

The process diagram of use case 400 includes an example AV delivery vehicle 402, a jewelry store, 404, an appraiser 406, a wait state 408, a customer 410 and a portion of an electronic ledger 412. For the example use case corresponding to the process diagram of FIG. 4, a customer at customer computing device 102 places an online order for a watch at jewelry store 404. For this use case, the jewelry store 404 corresponds to the organization and organization server computer 114 is a server computer at the jewelry store 404 or at a corporate office of the jewelry store. In some implementations, organization server computer 114 can be a desktop computer instead of a server computer. For this use case, jewelry store 404 store has a business agreement with a transport security company to provide secure AVs for the jewelry store.

When the customer places the online order, the customer selects an option for an AV to deliver the watch to an appraiser so that the watch can be appraised. When the customer selects the option for the AV, organization server computer generates an access code, lock code and unlock code for a physical container for the AV. Organization server computer 114 then stores the access code, lock code and unlock code in a distributed ledger. Also stored in the distributed ledger are geolocations of the jewelry store, the appraiser and a physical location of the customer, for example the customer's home.

Organization server computer 114 then initiates a request to the transport security company to send an AV to jewelry store 404. Organization server computer 114 also sends a copy of the distributed ledger to an electronic computing device on the physical container, for example to container computing device 110 on physical container 108. Organization server computer 114 also sends the access code, lock code and unlock code to an employee at jewelry store 404.

When the AV arrives at a geolocation of the jewelry store 404, the employee at jewelry store 404 uses the access code to unmount physical container 108 from the AV. After the employee unlocks the physical container 108 using the unlock code, the employee places the watch in the AV, uses the lock code to lock physical container 108 and uses the access code to remount physical container 108 in the AV. The employee can then use an electronic computing device, such as business computing device 104, to initiate an action to direct the AV to a next destination location indicated on the distributed ledger.

In an example implementation, the employee can issue a directive to container computing device 110 to direct the AV to the next destination location. Container computing device 110 can then access the geolocation of the next destination location and initiate a command to direct the AV to the next destination location, in this example the location of the appraiser 406. The employee can also issue a directive for the distributed ledger to have the AV wait at the appraiser 406 before leaving the geolocation of the appraiser 406. The commands to direct the AV to the next physical location and to have the AV wait at the appraiser 406 are also stored in the distributed ledger.

In the example use case 400 shown in the process diagram of FIG. 4, the same access code, unlock code and lock code used at jewelry store 404 are also configured to be used at appraiser 406. The employee at the jewelry store 404 uses business computing device 104 to email the access code, unlock code and lock code to an employee at the appraiser 406. In an alternative example use case, the employee at the jewelry store 404 can use business computing device 104 to generate a new access code, unlock code and lock code for use at the appraiser 406. In this alternative use case, the new access code, unlock code and lock code are sent to and stored at container computing device 110 and also are emailed to the employee at appraiser 406.

As discussed, once the distributed ledger is programmed with the destination address of the appraiser 406, the physical container 108 is geo-fenced so that it can only be accessed and unlocked at the geolocation of the appraiser 406 and only by using the access code and unlock code stored in the distributed ledger on container computing device 110. Also, as discussed, only the employee at the appraiser 406 has the access code and unlock code needed to access and unlock physical container 108 at the geolocation of the appraiser 406.

When the AV arrives at the physical location of the appraiser 406, the employee at the appraiser 406 can use the access code emailed to the employee to unmount physical container 108 from the AV. The employee can then use the unlock code mailed to the employee to remove the watch. After the watch is appraised, the employee can place the watch back in physical container 108, use the lock code emailed to the employee to lock physical container 108 and use the access code to remount physical container 108 in the AV. The employee can then use business computing device 104 to direct the AV to the next physical location, in this case the physical location of customer 410. The employee can email customer 410 the access code, lock code and unlock code. The employee can also use business computing device 104 to update the distributed ledger stored on container computing device 110. Any changes made to the distributed ledger are also updated at organization server computer 114.

As shown in FIG. 4, use case 400 includes a wait state 408. The wait state 408 prevents the AV from being directed to a next or different physical location until after the appraisal is completed, the watch is placed back in physical container 108 and physical container 108 is remounted in the AV. For use case 400, after physical container 108 is remounted in the AV, when the employee at appraiser 406 uses business computing device 104 to direct the AV to the physical location of customer 410, the wait state is automatically reset.

When the AV arrives at the physical location of customer 410, the customer can use the access code and unlock code emailed to the customer to unmount physical container 108, unlock physical container 108 and remove the watch. The customer can update the distributed ledger, remount physical container 108 in the AV and direct the AV back to the transport security company that provided the AV.

FIG. 4 also shows a portion of the contents of the electronic ledger 412. As shown, the contents include To: destinations of jewelry store 404, appraiser 406 and customer 410. Also shown is the wait state. The contents also include a Return: location of jewelry store 404. The AV can be directed to the return location if an unexpected event occurs, such as the AV not arriving at a destination location within a predetermined amount of time.

Use case 400 can also include a payment of fees at one or more of the destination locations and at a time of the purchase of the watch. For example, at the time of the purchase of the watch, the customer can choose to pay a fee for non-stop transport of the watch from the jewelry store 404, the appraiser 406 and the customer 410. The customer can also choose to pay an insurance fee for transport, such that the watch can be insured for loss or damage during transport. In addition, one or more fees can be paid during physical transport. For example, a payment for the watch may need to be received from the customer before the watch is transported from the jewelry store 404 to the appraiser 406.

Figure 5:
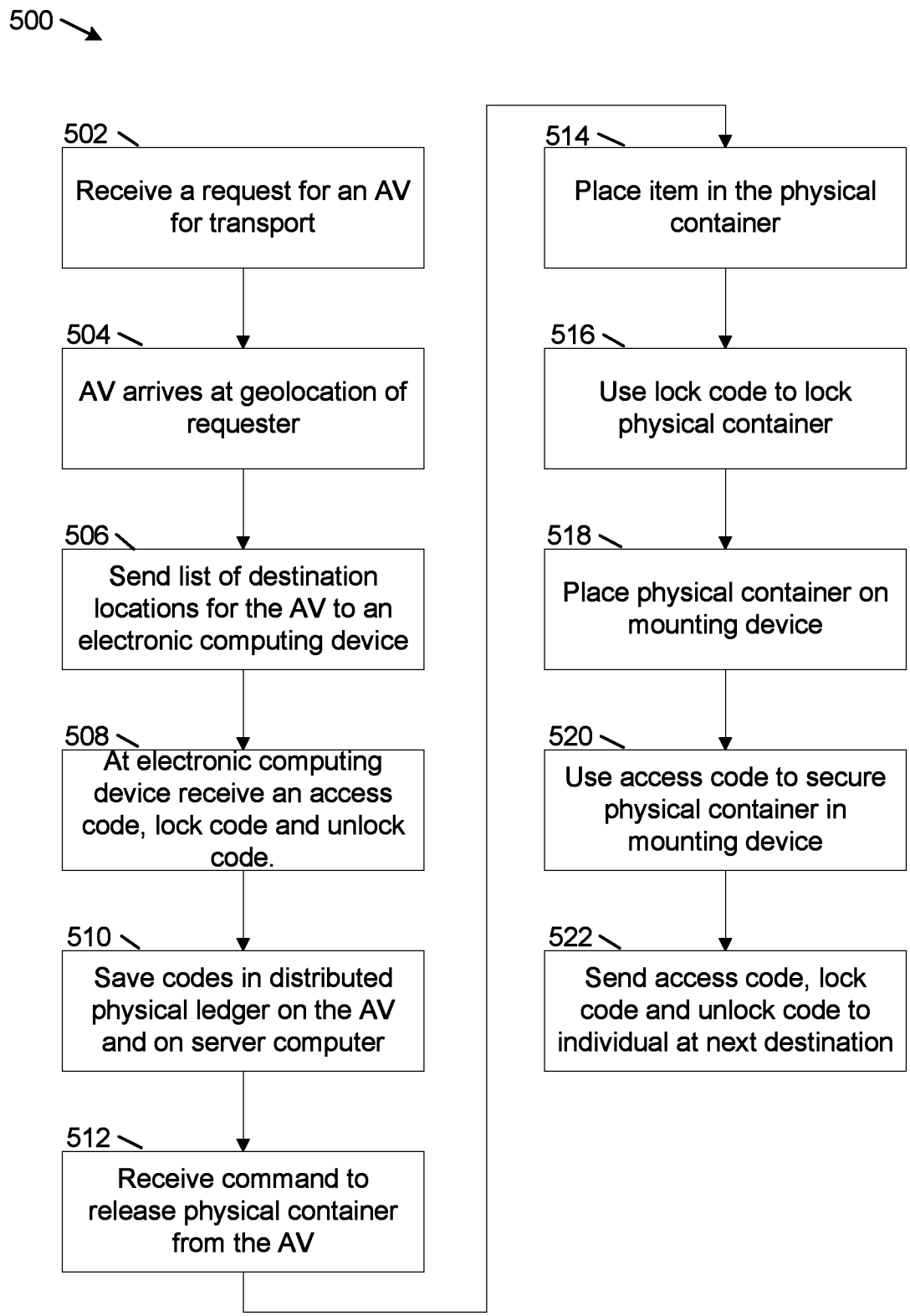
FIG. 5 shows an example method for secure transport of an item using an autonomous vehicle.

FIG. 5 shows a flowchart for an example method 500 for secure transport of an item using an AV. For method 500, the AV is obtained from a security company that provides secure AVs for transporting items between destinations. For method 500, the security company has a business agreement with a third party organization, in this case a jewelry store. The jewelry store arranges to obtain the AV from the security company to securely transport an item of jewelry purchased by a customer of the jewelry store to one physical location to one or more additional physical locations.

At operation 502 the security company receives a request from the jewelry store for an AV to transport an item of jewelry to a destination location, in this example to a geolocation of an appraiser. The request can be received at a server computer of the security company, for example at organization server computer 114.

At operation 504, the AV arrives at the geolocation of the jewelry store.

At operation 506, the security company, via organization server computer 114, sends a list of destination locations for the AV to an electronic computing device. For method 500, the electronic computing device is included within a physical container that is mounted or securely placed in the AV. The electronic computing device can also implement a distributed ledger that can store the destination locations. The destination locations comprise locations to which the AV can be directed to travel. For example, one destination location can be a geolocation of an appraiser. A second destination can be a geolocation of the jewelry store (for example to receive the item of jewelry after the item of jewelry has been appraised) or a geolocation of the customer (to deliver the item of jewelry to the customer after the item of jewelry has been appraised). Organization server computer 114 can also store a copy of the distributed ledger.

At operation 508, the electronic computing device received an access code, a lock code and an unlock code. The access code, lock code and unlock code can be sent to the electronic computing device from an employee of the jewelry store at business computing device 104. The employee can generate the access code, lock code and unlock code via a software application on business computing device 104.

In some implementations, when the physical container is locked and mounted on the AV, organization server computer 114 can send an existing access code, lock code and unlock code to business computing device 104. The employee at business computing device 104 can then use access code to unmount the physical container, the unlock code to unlock the physical container and the lock code to lock the physical container after the item of jewelry is placed in the physical container. The employee can also generate a new access code, lock code and unlock code per the software application to change these codes, per operation 508.

At operation 510, the access code, lock code and unlock codes are saved in the electronic computing device in the physical contained on the AV and also saved on organization server computer 114.

At operation 512, the electronic computing device receives a command to release the physical container from the AV. Releasing the physical container can comprise unmounting the physical container in the AV or releasing the physical container from a secured placement in the AV. The command can be sent by the employee via the software application on business computing device 104.

At operation 514, the employee places the item of jewelry in the physical container.

At operation 516, the employee sends the lock code to the electronic computing device to lock the physical container. The employee can send the lock code via the software application on business computing device 104.

At operation 518, the employee places the physical container on the mounting device in the AV or in a box in the AV that can securely hold the physical container.

At operation 520, the employee sends the access code to the electronic computing device to either mount the physical container in the AV or to secure the physical container in the box in the AV.

At operation 522, the employee sends the access code, lock code and unlock code to an individual at the next destination location.

Figure 6:
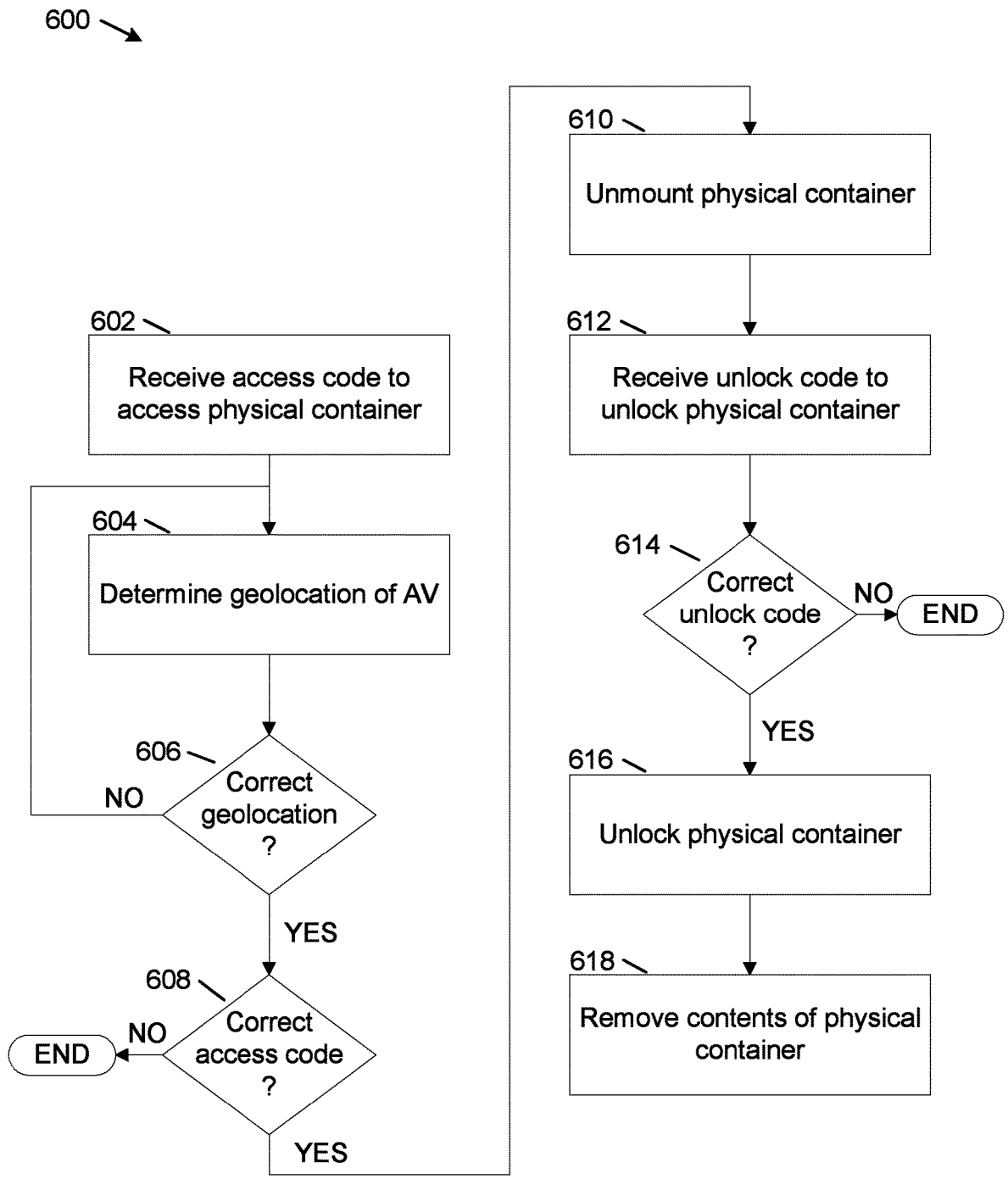
FIG. 6 shows an example method for accessing contents of a physical container in an autonomous vehicle at a destination location.

FIG. 6 shows a flowchart for an example method 600 for accessing contents of a physical container in an AV at a destination location. For method 600, the destination location is a geolocation of an appraiser. The geolocation of the appraiser is the next destination after the jewelry store.

At operation 602, when the AV arrives at the geolocation of the appraiser, an access code is received at the electronic computing device in the physical container to unmount or release the physical container in the AV.

At operation 604, the geolocation of the AV is determined. The geolocation of the AV can be determined via GPS software that can be included in the electronic computing device of the physical container or in another electronic device on the AV.

At operation 606, a determination is made as to whether the geolocation of the AV corresponds to the geolocation of a destination location, in this example the geolocation of the appraiser.

At operation 606, when a determination is made that the geolocation of the AV does not corresponds to the geolocation of the appraiser, control returns to operation 604 where the geolocation of the AV is determined again.

At operation 606, when a determination is made that the geolocation of the AV does correspond to the geolocation of the appraiser, at operation 608, a determination is made as to whether the access code matches the access code stored in the electronic computing device and needed to obtain access to the physical container.

At operation 608, when a determination is made that the access code is incorrect and does not match the access code stored in the electronic computing device, access to the physical container is denied and method 600 ends.

At operation 608, when a determination is made that the access code is correct and matches the access code stored in the electronic computing device, at operation 610 the physical container is unmounted from the AV. Alternatively, the physical container is released from the box in the AV that secures the physical container in the AV.

At operation, 612, after the physical container is unmounted or released, an unlock code is to unlock the physical container is received at the electronic computing device.

At operation 614, a determination is made as to whether the unlock code matches an unlock code stored in the electronic computing device to unlock the physical container.

At operation 614, when a determination is made that the unlock code is incorrect and does not match the unlock code stored in the electronic computing device, the physical container is not unlocked and method 600 ends.

At operation 614, when a determination is made that that the unlock code is correct and matches the unlock code stored in the electronic computing device, at operation 616, the physical container is unlocked.

At operation 618, the contents in the physical container are removed.

Figure 7:
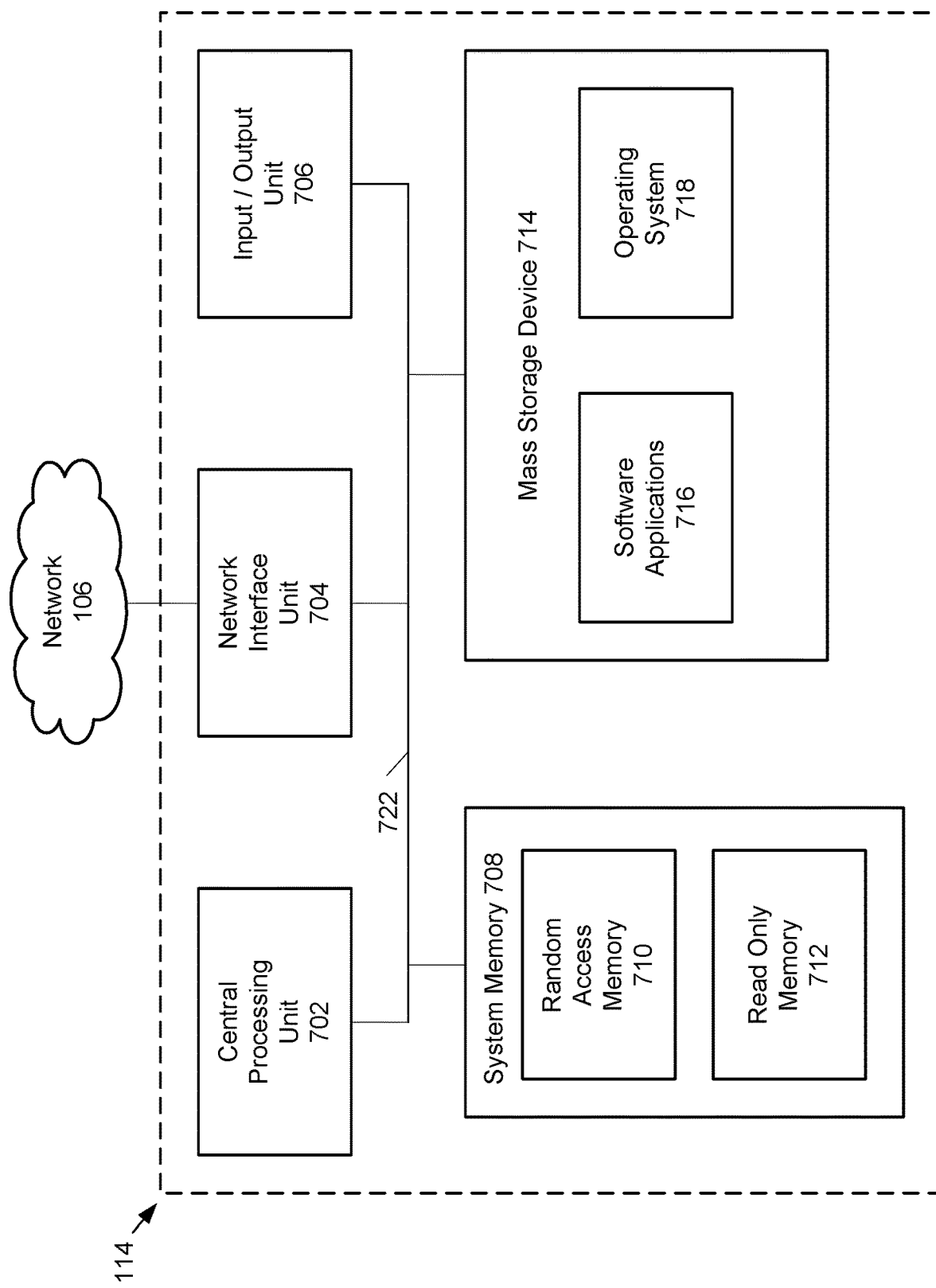
FIG. 7 shows example physical components of the organization server computer of the system of FIG. 1.

As illustrated in the example of FIG. 7, organization server computer 114 includes at least one central processing unit ("CPU") 702, also referred to as a processor, a system memory 708, and a system bus 722 that couples the system memory 708 to the CPU 702. The system memory 708 includes a random access memory ("RAM") 710 and a read-only memory ("ROM") 712. A basic input/output system that contains the basic routines that help to transfer information between elements within the organization server computer 114, such as during startup, is stored in the ROM 712. The organization server computer 114 further includes a mass storage device 714. The mass storage device 714 is able to store software instructions and data. Some or all of the components of the organization server computer 114 can also be included in customer computing device 102, business computing device 104 and container computing device 110.

The mass storage device 714 is connected to the CPU 702 through a mass storage controller (not shown) connected to the system bus 722. The mass storage device 714 and its associated computer-readable data storage media provide non-volatile, non-transitory storage for the organization server computer 114. Although the description of computer-readable data storage media contained herein refers to a mass storage device, such as a hard disk or solid state disk, it should be appreciated by those skilled in the art that computer-readable data storage media can be any available non-transitory, physical device or item of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the organization server computer 114.

According to various embodiments of the invention, the organization server computer 114 may operate in a networked environment using logical connections to remote network devices through the network 106, such as a wireless network, the Internet, or another type of network. The organization server computer 114 may connect to the network 106 through a network interface unit 704 connected to the system bus 722. It should be appreciated that the network interface unit 704 may also be utilized to connect to other types of networks and remote computing systems. The organization server computer 114 also includes an input/output controller 706 for receiving and processing input from a number of other devices, including a touch user interface display screen, or another type of input device.

Similarly, the input/output controller 706 may provide output to a touch user interface display screen or other type of output device.

As mentioned briefly above, the mass storage device 714 and the RAM 710 of the organization server computer 114 can store software instructions and data. The software instructions include an operating system 718 suitable for controlling the operation of the organization server computer 114. The mass storage device 714 and/or the RAM 710 also store software instructions and software applications 716, that when executed by the CPU 702, cause the organization server computer 114 to provide the functionality of the organization server computer 114 discussed in this document. For example, the mass storage device 714 and/or the RAM 710 can store software instructions that, when executed by the CPU 702, cause the organization server computer 114 to display received data on the display screen of the organization server computer 114.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an electronic computing device for securely transporting items in an autonomous vehicle (AV) between travel destinations, the method comprising:
   implementing an electronic ledger on the electronic computing device;
   storing in the electronic ledger one or more electronic codes for controlling access to a physical container that can be secured in the AV, wherein the electronic computing device is embedded in the physical container;
   storing in the electronic ledger one or more destination addresses for the AV;
   receiving a lock code to lock the physical container;
   determining that the lock code matches one of the one or more electronic codes;
   in response to determining that the lock code matches one of the one or more electronic codes, electronically locking the physical container;
   after receiving an access code that matches one of the one or more electronic codes, securing the physical container in the AV;
   obtaining a destination address from the electronic ledger; and
   directing the AV to transport the physical container to the destination address.

2. The method of claim 1, further comprising:
   obtaining a current geolocation of the AV;
   determining whether the AV is at a geolocation of the destination address;
   receiving a request to access the physical container, the request including the access code;
   determining whether the access code in the request matches one of the one or more electronic codes; and
   when the access code in the request matches one of the one or more electronic codes and when the AV is at the geolocation of the destination address, permitting access to the physical container.

3. The method of claim 2, wherein permitting access to the physical container comprises unmounting the physical container from a mounting location in the AV.

4. The method of claim 2, further comprising:
   receiving an unlock code to unlock the physical container;
   determining whether the unlock code matches one of the one or more electronic codes; and
   when the unlock code matches one of the one or more electronic codes and when the AV is at the geolocation of the destination address, unlocking the physical container.

5. The method of claim 4, wherein after the physical container is unlocked, further comprising:
   receiving a lock code to lock the physical container;
   determining whether the lock code matches one of the one or more electronic codes; and
   when the lock code matches one of the one or more electronic codes and when the AV is at the geolocation of the destination address, locking the physical container.

6. The method of claim 1, wherein the electronic ledger is a distributed ledger that uses blockchain technology.

7. The method of claim 1, further comprising storing a return location in the electronic ledger, the return location comprising a return address for the AV in case of a predetermined conditions.

8. The method of claim 7, further comprising:
   receiving a command to direct the AV to the return location;
   retrieving the return location from the electronic ledger; and
   directing the AV to the return location.

9. The method of claim 8, wherein the command is received when the AV does not arrive at the destination address within a specific time period.

10. The method of claim 1, further comprising:
    receiving a request for non-stop delivery; and
    directing the AV to only travel to the one or more destination addresses stored in the electronic ledger.

11. The method of claim 1, further comprising:
    receiving one or more new electronic codes for controlling access to the electronic ledger; and
    replacing the one or more electronic codes in the electronic ledger with the one or more new electronic codes.

12. The method of claim 1, further comprising:
    receiving an indication that insurance has been purchased by a customer for transporting the items; and
    updating the electronic ledger to reflect that the insurance has been purchased.

13. A method implemented on an electronic computing device for securely transporting items in an autonomous vehicle (AV) between travel destinations, the method comprising:
    receiving an itinerary for a trip using the AV, the itinerary including one or more destination locations;
    directing the AV to transport one or more of the items to a first of the destination locations;
    receiving an access code to access a physical container secured in the AV, wherein the electronic computing device is embedded in the physical container;
    determining whether the access code matches a first electronic code for accessing the physical container;
    identifying a current geolocation for the AV;
    determining whether the current geolocation matches a geolocation of the first of the destination locations;
    when a determination is made that the access code matches the first electronic code and that the current geolocation matches the geolocation of the first of the destination locations, releasing the physical container from the AV;
    receiving a lock code for locking the physical container;

determining that the lock code matches a second electronic code for locking the physical container;

in response to determining that the lock code matches the second electronic code, locking the physical container.

14. The method of claim 13, further comprising storing the itinerary for the trip in a distributed ledger on the electronic computing device.

15. The method of claim 14, further comprising:
obtaining the first of the destination locations from the distributed ledger.

16. The method of claim 15, further comprising updating the distributed ledger to reflect that the AV is directed to the first of the destination locations.

17. The method of claim 15, further comprising:
determining an elapsed time from when the AV was directed to the first of the destination locations; and when the current geolocation of the AV is not the first of the destination locations and when the elapsed time is greater than a predetermined value:
obtain a return address from the distributed ledger; and
direct the AV to the return address.

18. An electronic computing device, comprising:
a processor; and
system memory, the system memory including instructions which, when executed by the processor, cause the electronic computing device to:
receive one or more electronic codes for controlling access to a physical container that can be secured in an autonomous vehicle (AV), the one or more electronic codes including an access code, a lock code and an unlock code, wherein the electronic computing device is embedded in the physical container;
receive one or more destination locations for the AV;
receive an indication that the physical container is secured in the AV;
after the physical container is secured in the AV, initiate a command to direct the AV transport the physical container to a first of the one or more destination locations;
receive a first electronic code to access the physical container;
receive a current geolocation of the AV;
determine whether the current geolocation of the AV matches a first of the one or more destination locations;
when a determination is made that the current geolocation of the AV matches one of the one or more destination locations:
determine whether the first electronic code matches the access code;
when a determination is made that the first electronic code matches the access code:
release the physical container from a secured position in the AV;
receive a second electronic code to unlock the physical container; and
when a determination is made that the second electronic code matches the unlock code, unlock the physical container and permit the physical container to be opened; and
when a determination is made that the current geolocation of the AV does not match any of the one or more destination locations, prevent the physical container from being released from the secured position in the AV.

* * * * *